May 7, 1929.    G. STEERUP    1,711,816
LIGHTNING ARRESTER
Filed June 4, 1925    5 Sheets-Sheet 1
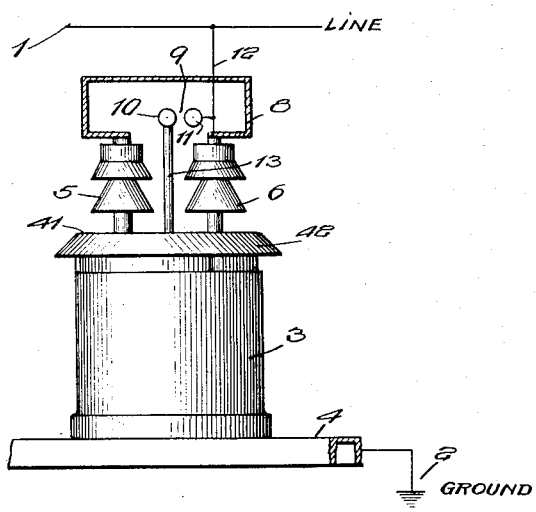
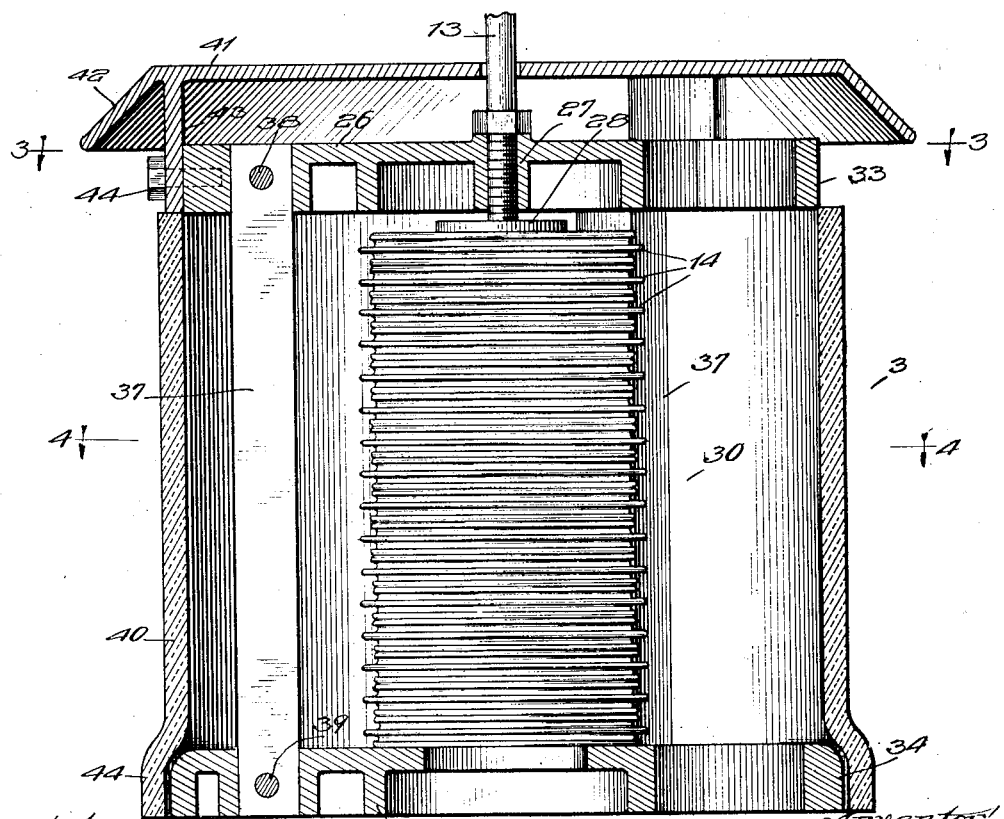

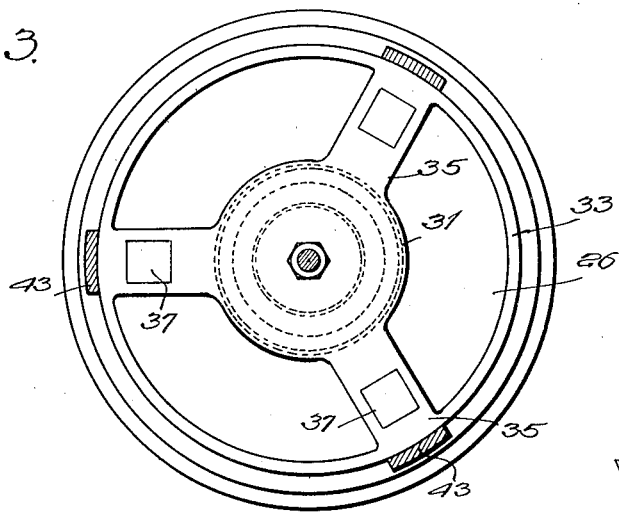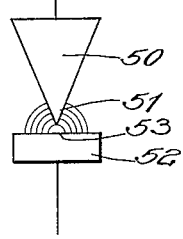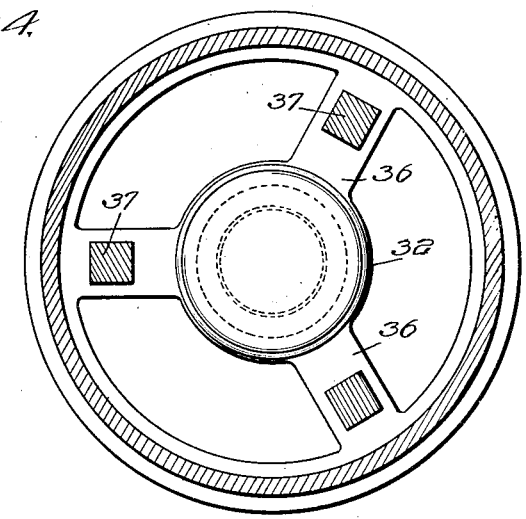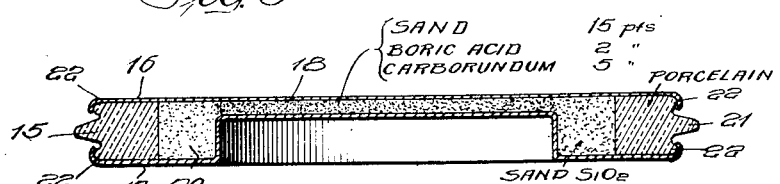

May 7, 1929.  G. STEERUP  1,711,816
LIGHTNING ARRESTER
Filed June 4, 1925  5 Sheets-Sheet 3

Witnesses:
William P. Kilroy
Harry R. Lubete

Inventor
Godfrey Steerup
By Brown, Boettcher & Diener
Attys

May 7, 1929.  G. STEERUP  1,711,816
LIGHTNING ARRESTER
Filed June 4, 1925  5 Sheets-Sheet 4

Witnesses:
William P. Kilroy
Harry A. L. White

Inventor:
Godfrey Steerup
By Brown Boveri Drennen
Attys.

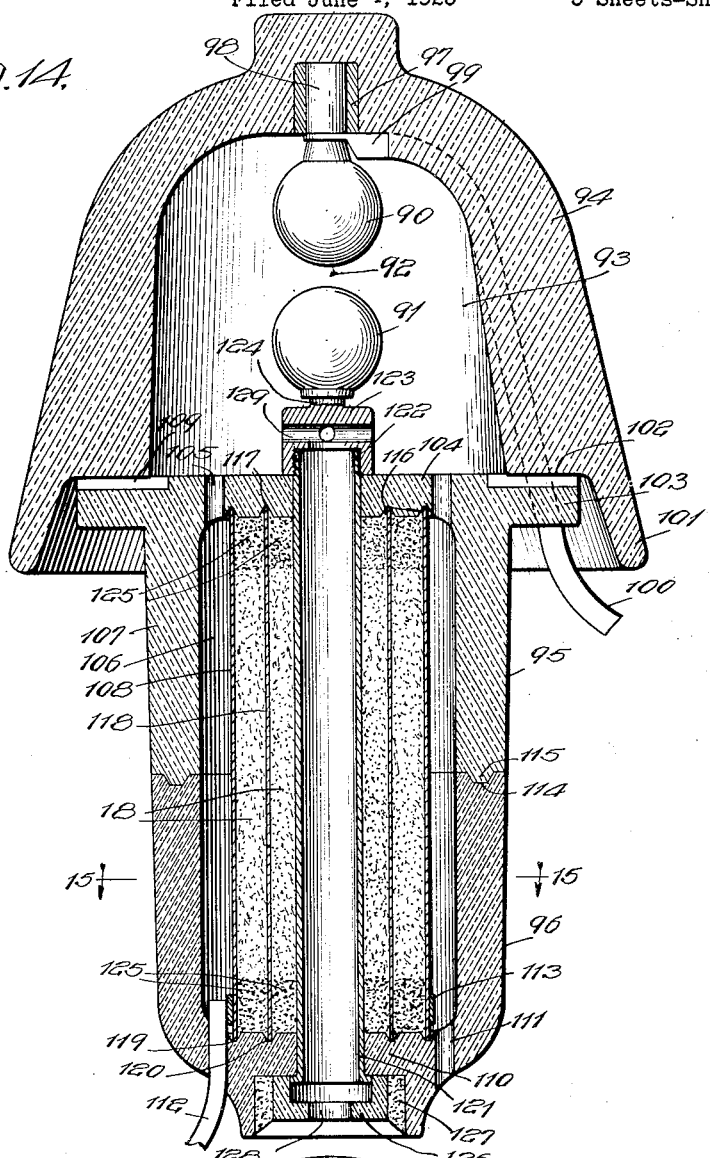
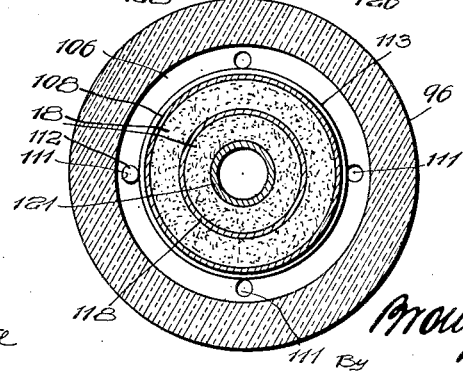

Patented May 7, 1929.

1,711,816

UNITED STATES PATENT OFFICE.

GODFREY STEERUP, OF CHICAGO, ILLINOIS, ASSIGNOR TO ELECTRICAL ENGINEERS EQUIPMENT COMPANY, OF CHICAGO, ILLINOIS, A CORPORATION OF ILLINOIS.

LIGHTNING ARRESTER.

Application filed June 4, 1925. Serial No. 34,754.

My invention relates to lightning arresters.

The character of electrical disturbances known by the general term lightning is not well understood. There seems to be satisfactory evidence that a disruptive discharge tends fundamentally to be oscillatory in character. Whether the resulting disturbance be oscillatory or merely unidirectional, i. e., a surge, depends upon the constants of the discharge circuit. In every case the disturbance includes excessive voltage.

An arrester to be successful commercially must be capable of discharging to ground the excessive voltage representing the disturbance and retain upon the line the voltage of the normal power current. To this extent a lightning arrester should be selective in discharging the disturbance and not the power current. In addition, it must be protective in preventing the power current from passing to ground and if a flow of current does start to ground, the arrester should function to limit or completely cut off the flow of power current.

The requirements of providing a free and direct path to ground for the disturbance and of limiting or cutting off the flow of power current are contradictory.

It is the practice at present to provide a ground connection in which a current flow limiting or controlling device is provided and to separate the aforesaid ground connection from the line by a spark gap requiring an abnormal voltage above the power voltage, to break down the same. The usual mode of operation is for the current flow limiting device to reduce the flow of current to a point where the arc at the spark gap will no longer maintain itself.

I provide, according to the present invention, a novel current limiting or controlling element. This element has a peculiar and highly characteristic effect upon the arc at the spark gap, causing it to be extinguished or blown out in a very unusual and yet desirable manner, resembling the effect of a magnetic blow out.

According to my invention, I provide a conductive path between two plates or electrodes, which path is in reality a leakage connection and it has inherent current controlling characteristics, not only in the sense of limiting the amperage which may flow, but rather in producing a change in the character of the current. In the preferred form of my invention, this path comprises a mixture of crystalline or granular materials of exceptional heat resisting properties and of great stability. These materials are preferably sea sand and carborundum with an optional ingredient of boracic acid. In operation the dynamic current flow, which follows a discharge due to a disturbance, appears to activate the mixture to cause a rectifying action. This rectifying action in turn so controls the current flow that the arc at the spark gap is quickly extinguished.

The rectification seems to be a suppression of certain parts of the wave of the power current, more particularly the current flow drops to zero as the voltage wave approaches zero and the power current finds difficulty in establishing itself until the voltage rises to a relatively high value.

I have observed that the current flow often fails completely to reestablish itself in one direction with the result that rectification, more or less complete, occurs.

This rectification appears to be confined to no particular direction and, in fact, in tests which I have conducted it will change from rectification in one direction to rectification in another direction, without any apparent cause.

This leakage path between the electrodes seems to perform a dual function first, that of a dielectric of high specific inductive capacity and next, that of a leakage path of relatively high resistance, but of inherently protective and current controlling or modifying capability.

I have connected the current limiting device directly between the line and ground without the interposed spark gap and I find that the current limiting and rectifying action occurs just the same. The spark gap is desirable as it cuts off leakage current.

Now in order to acquaint those skilled in the art with the manner of constructing and operating a device embodying my invention, I shall describe in connection with the accompanying drawings a specific embodiment of the same.

In the accompanying drawings:—

Figure 1 is a front elevational view of an arrester embodying my invention;

Fig. 2 is a vertical section through the same;

Fig. 3 is a horizontal section taken on the line 3—3 of Fig. 2;

Fig. 4 is a similar cross section taken on the line 4—4 of Fig. 2;

Fig. 5 is a vertical section through an arrester unit;

Fig. 10 is a diagram of the carborundum grains;

Fig. 14 is a vertical section through a modified form of the invention; and

Fig. 15 is a horizontal section taken on the line 15—15 of Fig. 14.

Figure 6:
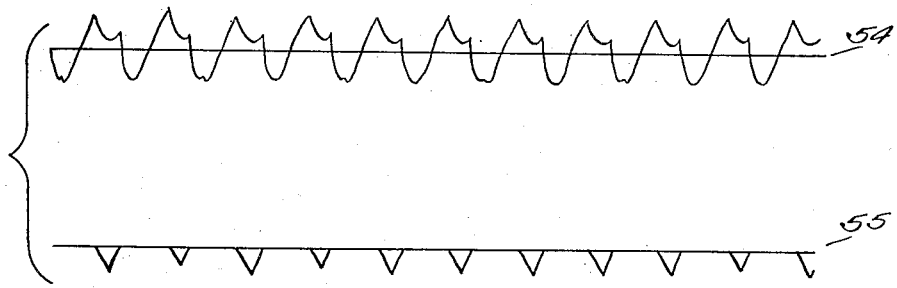
Figs. 6, 7, 8 and 9 are oscillograph records of the current flow through a unit, such as that shown in Fig. 5.

In Figs. 1 to 5 I have shown an arrester which is connected between line 1 and ground 2, the body 3 of the arrester being mounted upon an iron frame 4, which is suitably grounded. The body of the arrester 3 carries two or more insulators, such as 5 and 6, upon the cap of which is mounted a suitable hood 8, enclosing a spark gap 9 formed between the two spheres 10 and 11. The weatherhood 8 may be a metal box closed at the top and more or less open at the bottom and sides so as to keep the spark gap 9 substantially free of weather conditions. The sphere electrode 11 is connected by conductor 12 to the line 1, whereas the sphere 10 is mounted upon a rod 13 which leads to the active elements 14, 14 of the arrester proper. The elements 14, 14 which are shown in section in Fig. 5, comprise preferably a short sleeve or ring of insulating material 15, for example, procelain which I have found to be excellent, having two plates 16 and 17 disposed on opposite sides out of electrical contact with each other and having a certain filling 18 between the central part of the plate or electrode, which filling 18 will be more specifically described hereafter. These plates 16 and 17 may be made of aluminum, copper, steel, or other metal. The bottom plate 17 has a cup shaped depression 19 formed therein, so as to decrease the space between the top and bottom plates.

The particular form of the plates may be varied. For example, both plates may have depressions therein so that they are alike and will hold the filling material 18 midway between them.

In the annular space about the depression 19 and between the plates 16 and 17 I provide a filling 20 of granular insulating material which, in the preferred embodiment, is a pure quartz sand. This sand is known in the trade as sea sand and the size of the grains which I employ is preferably 20 mesh, although this may be varied. The use of the filling of sand 19 between the active mixture 18 and the porcelain ring 15 is of great practical importance. I find that if the active mixture 18 is permitted to come into direct contact with ring 15, the said ring is quickly cracked and destroyed, even for small values of current flow.

The offsetting of the central part of the plate 17, as shown in Fig. 5, permits of a greater depth of insulation at the ring 15 and the pad of sand 20 than the depth of the active material 18. These relative dimensions may readily be varied by varying the amount of offsetting of one or both plates. The central filling 18 between the adjacent portions of the plates 16 and 17 comprises, according to the preferred form of my invention, sea sand of the same character above mentioned fifteen parts, and granular carborundum crystals five parts, and boric acid two parts, all by weight, and thoroughly mixed.

The sand, as above explained, should be pure quartz sand and is obtained on the market as sea sand and I employ in the preferred form of the invention grains of twenty mesh, or thereabout. The action which is secured is not dependent upon the size of the grains of the sea sand, but I find that the particular size which I have above mentioned is suitable and works satisfactorily. The boric acid is in crystalline form. The carborundum which is artificial silicon carbide is crystalline, preferably of twenty-four mesh size.

In practice the aforesaid mixture 18 is employed in a unit in which the dimensions are approximately twice those shown in Fig. 5. Obviously the actual dimensions of the units may be widely varied.

The porcelain ring 15 may have a fin or flange 21 to increase the creepage surface of the same. If desired, the aluminum plates may extend outwardly in order to form cooling flanges, but in the form shown these plates are merely crimped or spun over the edges of beads 22 to form a closure and to retain the plates in place with respect to the porcelain or other ring of insulation 15.

These units 14, 14 are assembled in a stack between a lower metal frame member 25 and an upper metal frame member 26, which frame members may be substantially duplicates. The upper plate 26 has a central threaded opening 27 through which the lower end of rod 13 is threaded. The lower end of the rod presses upon a bearing plate 28 which holds the stack of units 14 between it and the bottom frame member 25. The frame members 25 and 26 are provided with central hub portions 31 and 32, respectively, outer rim portions 33 and 34, respectively, and three or more arms 35 and 36, respectively, connecting the centers or hubs with the rims. The arms 35 and 36 are provided with apertures or sockets into which are fitted the ends of rods 37, these rods being made of insulating material, preferably impregnated wood, and pinned by means of pins 38 and 39 to the upper and lower frame plates, respectively. The clamping of the units 14 between the upper and lower plates puts the rods 37 under tension.

An outer cylindrical envelope or sleeve 40 of insulating material, which may be of a piece of vitrified sewer pipe, or the like, encloses the stack 30 and connected parts and serves to protect the same against the weather.

A cover plate 41 having eaves 42 extending circumferentially thereabout is fastened to the upper ring 33 by means of three or more legs 43, which are fastened as by means of the cap screws 44 to said rings 33.

Now it is to be observed that the upper and lower frame plates are of spider formation, that is, are open above and below and the cover plate 41 does not close the upper frame plate, but provides merely downwardly extending eaves, so that air may freely circulate around the stack of units to cool the same.

The lower ring 34 fits inside of the flange of the sleeve 40, as indicated at 44, to hold the sleeve against downward movement, and the depending arms 43 of the cover plate 41 lie against the upper end of the sleeve 40 to hold it against displacement upwardly.

In practice the number of units which are assembled in the stack 30 depends upon the voltage of the line.

Where the voltage becomes so high as to place too many of these units in series for the proper or required capacity, I may place a number of stacks in parallel to give the desired discharge capacity.

Now I shall explain the operation of the device.

Assuming that there is a disturbance upon line 1, the gap 9 will be broken down and a discharge of the disturbance to ground through the rod 13, units 14, and ground connection 2, will occur. It is possible that each unit 14 of the arrester acts as a condenser, but it is certain that there is a conducting path through the active mixture 18 of each unit. The carborundum grains are of relatively low conductivity. The sea sand is of very high resistance but at the same time of good specific inductive capacity. The part which the boric acid plays I am unable to state.

As soon as the gap 9 is broken down the line current follows to ground. It appears to take a brief period of time for this flow of current to act upon the active mixture 18 to bring it to a sensitive condition, but immediately thereafter the flow of current across the gap 9, which forms an arc, is snapped out in a quick and decisive manner.

Obviously, the break down of the gap 9 and the conductive leakage path through the carborundum grains tends to permit power current to pass to ground. This is true no matter whether the disturbance be a wave train or an impulse. In other words, the leakage path by the very fact that it will conduct current from one place to the other for relieving a disturbance will, at the same time, serve as a conductive path for power current. I find that the carborundum grains, in the proportions which I have above mentioned, and generally in the proportion of three parts by weight of sea sand to one part by weight of carborundum, will produce a suitable leakage path and, at the same time, will secure the characteristic blow out which I have heretofore mentioned at the gap 9. That is to say, I have observed in the operation of the device of my invention that as soon as the disturbance has broken down the spark gap 9 and the current tends to follow, the arc which is formed at the gap is snapped out in a highly characteristic manner having much the sound and appearance of a magnetic blow out. The arc which is formed and which is blown out promptly does not necessarily move upward on the gap but it may move in any direction. I have observed on numerous occasions that the arc is blown out sidewise or even downwardly and there seems to be no preferred direction in which the blow out occurs.

I am at a loss for a suitable explanation of the peculiar blow out effect of the arc at the sphere gap, and beg leave to insert an explanation of the same as soon as I am aware of the correct explanation or a suitable theory which is in accordance with the facts which I have above stated.

My belief is that the carborundum grains in connection with each other afford a peculiar resistance to current flow, such as is afforded by the crystal detector known to wireless or the old coherer known in the early stage of wireless telegraphy.

I conceive, therefore, that the grains of carborundum in the mixture of sea sand have a current controlling effect which, for a lack of a better term, I call a rectifier effect.

Consider for the sake of clearness the diagram of Fig. 10 in which the upper grain 50 has a sharp point 51 and the lower grain 52 has a flat surface co-operating with said sharp point. This point contact may be considered as a minute needle gap which does not effectively conduct current until the potential across the two elements 50, 51 has risen to a predetermined break down value, whereupon a more or less conductive path is established which permits current to flow. I conceive of this flow of current between the elements 50 and 52 as being in reality a brush discharge which tends to cease as soon as the potential drops below the required break down value.

I have run oscillograph tests upon the device of my invention to find out what the action of the same is and the oscillograph shows that in some cases complete recification occurs, as is shown for example in the oscillogram of Fig. 6, where the upper graph 54 represents the potential wave and the lower graph 55 represents the current wave the horizontal line in each graph representing zero value. It will be seen that the potential wave is distorted, particularly the lower lobes are distorted by the flow of current which is shown on the lower graph 55. In this particular case complete rectification and suppression of the upper current waves occurred and the arc was unable to establish itself at the sphere gap 9, being blown out with the characteristic blow out effect which I have above mentioned.

Figure 7:
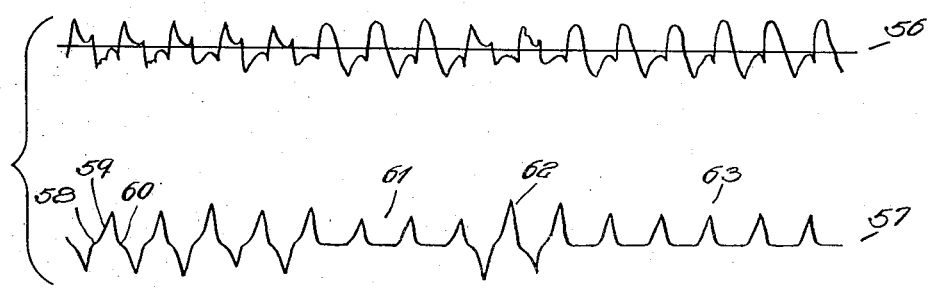

The graph of Fig. 7 shows an oscillogram in which the upper graph 56 represents potential and the lower graph 57 represents current. Now it will be seen from the first part of the graph 57 that rectification as such did not occur in this test, but the phenomenon of current suppression, due to the character of the crystals, is clearly evident. Consider the point 58 on the graph 57, it will be seen that when the potential is substantially zero, or a slight value thereabove, there is no appreciable current flow, but that when the potential reaches a certain break down value the current flow along the portion 59 of the curve rises very rapidly to a peak and then drops off, according to the same regularity, until a minimum voltage is again reached at 60, where the current flow again tends to remain zero until established in the opposite direction by resurgence of the break down voltage. Further along this graph 57, namely, along the portion 61, it will be seen that rectification has again occurred by suppression of the lower current waves. At the point 62 the rectification is incomplete, but it will be seen that the lower current waves are reduced in amount above the upper current waves and then at the part 63 rectification again occurs. The action occuring in the current wave is reflected in the character of the potential wave 56, as will be apparent upon examination.

Figure 8:
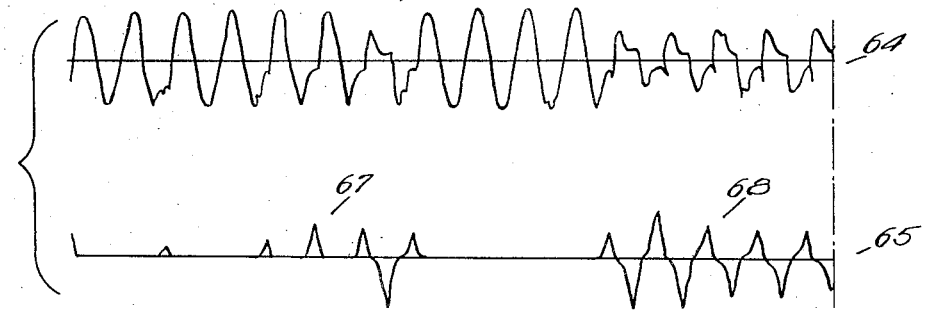

Fig. 8 represents another oscillogram which I have taken during tests of the device of my invention.

Figure 9:
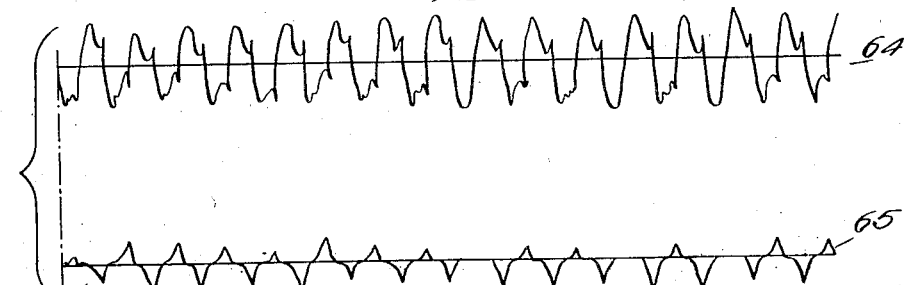

Figs. 8 and 9 are parts of the same record, Fig. 9 being a direct continuation of Fig. 8. The upper graph 64 of Fig. 8 is the potential graph and the lower graph 65 is the current graph. The same thing is true in Fig. 9. The remarkable part of this oscillogram is that rectification in one direction occurs, as indicated at 67, then there is a period of non-rectification at 68 and the latter part of the graph, as shown in Fig. 9, has partial, and in some cases, complete rectification in the opposite direction.

At all events it is plain from these graphs that the material which I use as the active filler between the plates 16 and 17 requires a definite voltage for its break down effect and apparently this characteristic secures the unique blow out effect at the sphere gap which I have mentioned.

In the construction of the units, such as shown in Fig. 5, the ring of sea sand at 20 forms a dielectric medium and insulting means between the active filler 18 and the porcelain ring 15. This ring 20 of sand and the porcelain ring 15 are not active for direct conductivity, but both form parts of a condenser.

The extent and thickness of the leakage path with respect to the capacity of the condenser may be varied by suitable design as, for example, the central space between the boss 19 and the plate 16 may be filled with pure sea sand and the annular ring 20 may be partly filled with the mixture containing the leakage path. It is important to keep a body of sand between the ring 15 and the active mixture 18. The capacity may be increased and the leakage path decreased, or vice versa, by suitable design, all as may be desired and as will be apparent to those skilled in the art.

It is conceivable that the carborundum grains do not function each and every one, as indicated in Fig. 10, but that in certain cases actual electrical connection between adjacent grains may be had so that merely resistance is presented.

I have up to the present been unable to account for the value of the crystalline boric acid which I find improves the action of the device.

I have run experiments which show conclusively that the boric acid improves the operation of the device and secures to a greater extent the unique blow out effect which I have mentioned.

While the preferred mixture is fifteen parts of sea sand by weight to two parts of boric acid by weight to five parts of carborundum by weight, the simple mixture of three parts of sea sand by weight to one part of carborundum by weight will give the characteristic blow out effect at the sphere gap.

In experiments which I have conducted I employ a layer of the active mixture 18 of a thickness of ¼th of an inch between the two metallic electrodes of an active diameter of substantially five inches and an overall diameter of substantially nine inches, as shown in Fig. 9, and to such a unit I assign an arrester value of 1,000 volts. That is to say, such a unit in series with a spark gap operates satisfactorily as an arrester on a line voltage of 1,000. Where the voltage of the line is increased the number of units in series or in parallel may be increased.

I have tried numerous mixtures of various materials to see if I can determine definitely the value of the different parts of the mixture which gives the best results.

For example, I have tried mixtures as follows, all of these being stated in parts by weight. First I tried a mixture of three parts of sea sand and one part granulated galena. This acted as a straight resistance and gave no indication of the characteristic blow out at the gap. Next I tried a mixture of sea sand nine parts and one part galena. Again the mixture gave no characteristic blow out. Thereafter I tried a mixture comprising three parts of sea sand, four parts of boric acid, and one part twenty mesh granular aluminum. I found that this mixture has the characteristic blow out, but it will not stand up very long.

I tried numerous mixtures of sea sand, boric acid, and another element, for example, carbon of coarse grain, iron filings, a mixture of carborundum and carbon, and various other materials, finding that in general they were not suitable and not as satisfactory as the mixture of sea sand, carborundum and boric acid which I have above mentioned.

I tried also numerous substitutes for the sea sand as, for example, glass beads of various diameter and found them to be entirely unsuited.

So nearly as I am able to say, the boric acid seems to improve the mixture for securing the unique and characteristic blow out effect of the arc. So nearly as I can make out from my experiments, the boric acid tends to form a film of more or less rectifying characteristic between, for example, the point 50 and the plate 52, as shown in Fig. 10, requiring a definite voltage for break down to a greater degree than a straight air gap between the parts 50 and 52.

It appears also that the boric acid has high specific inductive capacity.

The quartz or sea sand seems to be the essential part of the condenser for satisfactory operation and the leakage path which is normally formed by the carborundum may be substituted by metals or by galena, provided that an appreciable amount of boric acid is present.

As to the plain mixtures of carborundum and sea sand, I wish to call attention to the fact that equal parts by weight of carborundum and sea sand do not appear to give the characteristic blow out effect, nor will one part of carborundum to five parts of sea sand give it, but the proportions of one part of carborundum to two, three, or even four parts of sea sand give the characteristic blow out effect under favorable conditions. Throughout all the experiments which I have conducted I find that the addition of boric acid assists the characteristic blow out effect. The percentage which appears to be proper to amplify the effect lies between five to twenty per cent.

While metals may be substituted for the carborundum when used in conjunction with boric acid, it is to be noted that such mixture breaks down very readily and loses the characteristic blow out effect, apparently because a straight conductive path is formed providing merely a plain ohmic resistance.

Figure 11:
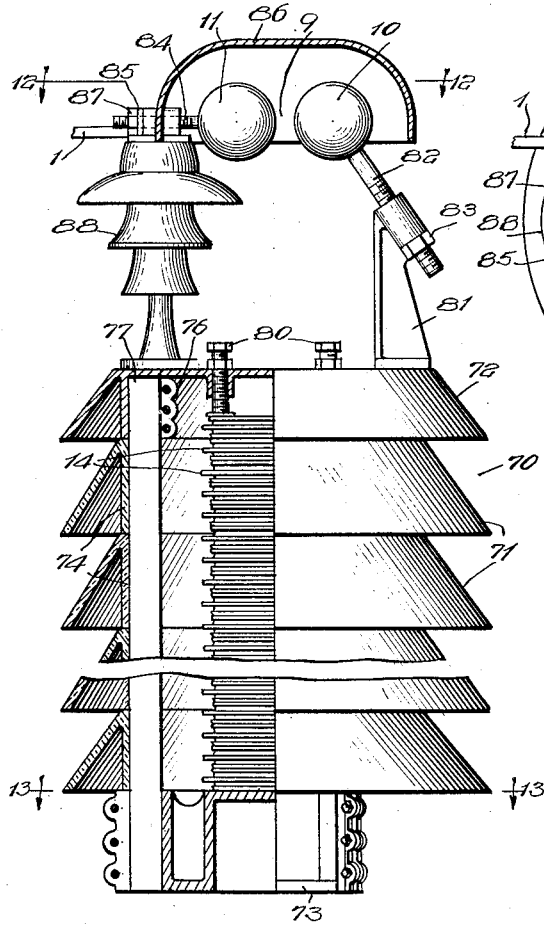
Fig. 11 is a side elevational view partly in section of an arrester embodying the invention.
Figure 12:
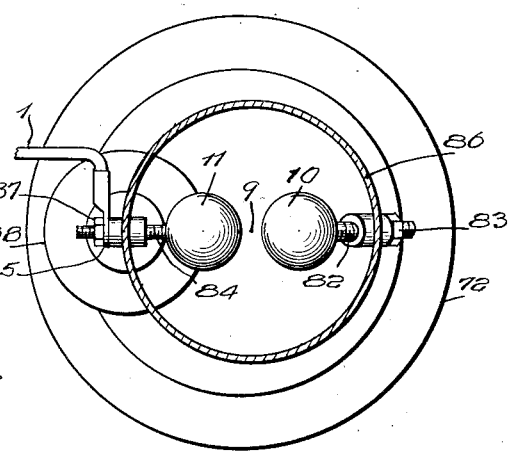
Fig. 12 is a horizontal section taken through the weather hood on the line 12—12 of Fig. 11.
Figure 13:
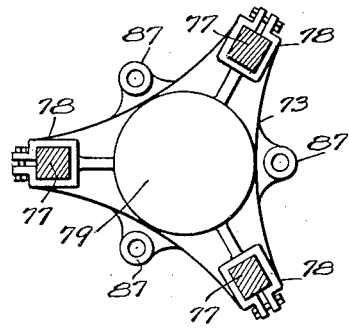
Fig. 13 is a similar section taken on the line 13—13 of Fig. 11.

In Figs. 11, 12 and 13 I have shown a modified form of the invention. In this embodiment the units 14 are housed in a ventilated housing 70, which is formed by mounting a plurality of housing sections having conical weather shedding surfaces 71 and stacked on top of each other and being mounted between the cap 72 and the base member 73, suitable spacing members 74 being provided between the tapered water shedding surfaces 75. The cap member 72 has clamps formed preferably integral with the bottom of the same, as indicated at 76, to clamp the ends of the insulating rods 77, which may be formed of suitably treated wood, for example, maple, suitably dried and boiled in paraffine. Three such rods 77 are employed and the corresponding clamps being provided on the bottom of the cap member 72 to hold the same. The base member 73 likewise has three split clamps 78 for clamping the lower end of the rods 77. The central part of the base member 73 provides a supporting boss 79 upon which a stack of the units 14 is mounted, and the cap member 72 has a series of clamping screws 80, preferably three or more in number, for compressing the stack of units 14 and for making electrical contact between the uppermost one of the stack and the cap member 72. The cap member 72 is preferably made of aluminum and the weather hoods or sections 71 are preferably made of porcelain, or like insulating material. These water sheds or enclosing sections 71 may be completely closed circumferentially, or they may be open to permit circulation of air therethrough. The space between the upper section 71 and the cap 72 is open, except where the split clamps 76 are formed, so that air is free to circulate up along the sides of the stack of units 14 and out at the top, under the flared surface of the cap 72.

Upon the top of the cap 72 there is mounted the metal bracket 81 to which is connected the electrode 10, this electrode being preferably in the form of a metal sphere fastened upon a threaded stem 82, said stem being threaded through the upper end of the bracket 81 and locked in position by means of the lock nut 83.

The co-operating electrode 11, which is also a metal sphere in the form shown, has a stem 84 which threads through a boss 85 at one side of the metal weatherhood 86, and this stem 84 is locked by suitable lock nuts 87. The line wire 1 is connected to the electrode 11 in any suitable manner, the base 73 being connected to ground preferably by being mounted upon a metallic structure, which is grounded. The base member 73 is provided with suitable bolting lugs 87 by which the same may be securely clamped to a suitable supporting frame or space.

The operation of the device shown in Figs. 11 to 13 is substantially the same as shown in connection with Figs. 1 to 5, inclusive. In this form the adjustment of the pressure upon the stack of units is independent of the adjustment of the sphere gap 9 and the hood and live electrode 11 are mounted through a suitable insulator 88 in a more advantageous manner. The sections 14 are identical with those shown in Figs. 1 to 5, inclusive.

In the form shown in Figs. 14 and 15, my invention is embodied in a small enclosed lightning arrester for relatively low voltage work. In this construction the entire device is enclosed preferably in porcelain, a chamber 93 being formed at the upper end, and the electrodes 90 and 91 being housed in said chamber, these electrodes forming between them the spark gap 92. The housing is defined by an upper cap member 94, an intermediate member 95, and a bottom member 96, these parts being preferably all secured together in fixed relation. The cap member 94 is shaped like an inverted cup and it has in its upper inner surface a recess 97 in which there is seated a stud or insert 98 cemented in the recess 97 and bearing upon its lower end the electrode 90, this electrode being preferably in the form of a metal sphere, and the sphere clamping a terminal 99 in place, the terminal 99 being in turn connected through a flexible conductor 100 to the line or other live part to be protected. The conductor 100 extends through a groove formed in the side wall of the cap member 94 and under the eave or depending flange 101, which is formed on the lower edge of the cap member 94. On the inside of the cap member 94 and above the eave 101, there is formed a shoulder 102 which is adapted to seat upon the flange 103 formed on the upper end of the intermediate porcelain ring 95. This intermediate member 95 has a central plate 104 of which the flange 103 is an extension. Suitable ventilating openings 105 extend through the plate 104 down into the space 106 between the side walls 107, which are cylindrical, and the adjacent metal cylinder 108 which forms a part of the active element of the lightning arrester. The flange 103 has a series of grooves 109 formed in the top surface thereof, these grooves preferably extending out radially from a point within the inner diameter of the cap member 94, so as to leave open passageways from the space 93 to the space under the eave 101.

The flange 103 may be secured to the cap member 94 either by the mounting of the arrester, or by suitable bolts cemented into the body of the cap 94 and extending through suitable openings or notches in the flange 103.

The bottom member 96 has a bottom wall 110 which is also perforated by a series of openings 111 for purposes of ventilation, and also for the purpose of leading out through one of these perforations the ground lead 112, which ground lead 112 is connected to a metal ring 113 mounted upon the lower end of the outer metal cylinder 108.

The lower member 96 is formed in the shape of a porcelain cup and its upper edge or rim has a groove 114 formed therein, co-operating with a circular bead 115, these two parts forming a tongue and groove construction for forming a tight joint between the upper edge of the lower member 96 and the lower edge of the intermediate member 95. Preferably this joint is sealed with cement.

The bottom surface of plate 104 is provided with a pair of circular grooves 116 and 117 to receive the upper ends of the aluminum or other metallic cylinders 108 and 118. Likewise, the bottom plate 110 has formed therein the circular grooves 119 and 120 for receiving the lower ends of said metallic cylinders. The members 95 and 96 are held together by a central metal tube or hollow bolt 121 which has its lower edge beaded or riveted over the edge of the opening in the center of said bottom plate 110. The top of the tube 121 is threaded, as indicated at 122, and the metal cap 123 is threaded to the end of the tube and draws the two sections 95 and 96 together and holds them in fixed relationship. This cap or fitting 123 has a threaded stem 124 upon which the spherical electrode 91 is secured. The electrode 91 may be adjusted with respect to the electrode 90 by threading the same up or down on said stem 124.

The annular cylindrical space between the inner tube 121 and the tube 118 is filled with active material 18, and likewise the space between the tube 118 and the tube 108 is filled with active material, a packing of sea sand 125 being disposed, however, at the ends of such annular space in each case, to keep the active material 18 out of contact with the porcelain.

This packing of sea sand 125 is at each end of the metal tubes 121, 118 and 108.

The lower end of the tube 121 is covered with a porcelain cap 126 which is cemented in place in a recess 127 formed in the bottom of the lower porcelain member 96. This cap 126 has an opening 128 therethrough, permitting communication with the inside of the tube 126 with atmosphere. The fitting 123, which is secured to the top of the tube 121, likewise has ventilating openings 129 to permit free ventilation of the inside of the tube 121 to keep the same from heating. The space 106 is likewise ventilated through the openings 111 and 105. The operation of the device shown in Fig. 14 will be apparent from the foregoing description and from the explanation heretofore given. The sphere gap 92 is entirely enclosed and protected from the weather. Any pressure generated in the chamber 93 tends to be quickly relieved through the grooves 109, through the passageways 129, and through the openings 105. As soon as the gap 92 is broken down there is a flow of current from the line to the tube 126, and from the tube 126 through the active material 18 between the tubes 121 and 118, and from tube 118 through the active material 18 to the outer tube 108, which in turn is connected through the ring 113 to ground wire 112.

I do not intend to be limited to the details which I have shown and described, nor do I intend to be limited to the theory of operation which I have propounded, since the same is based merely upon my present knowledge and may upon fuller information be found to be more or less erroneous. I beg leave, therefore, to insert a correct statement of theory if and when I am able to formulate the same.

I claim:

1. In an arrester, the combination of a pair of electrodes, a granular medium between them comprising quartz crystals, and a leakage path between said electrodes comprising a refractory crystalline material and boracic acid interspersed with the quartz crystals.

2. In a device of the class described, a sleeve of insulating material, an electrode at each end of the sleeve, a body of granular conducting material between said electrodes, and a body of granular insulating material between said conducting material and said sleeve.

3. In a device of the class described, a pair of electrodes, a body of granular conducting material connecting said electrodes, a container of insulating material, and a filling of granular insulating material between said conducting material and said container.

4. In a device of the class described, a body of active material comprising a mixture of sea sand and carborundum, an enclosing sleeve of insulation, and an interposed filling of sea sand between the active material and the sleeve.

5. In a device of the class described, a body of active material comprising a mixture of granular quartz and a granular conducting material, an enlosing sleeve of vitreous material, conducting means in contact with the active material, and a filling of granular insulating material between the active material and the sleeve for preventing injury to said sleeve.

6. In a device of the class described, a pair of electrodes, a granular insulator between them, and a leakage path between said electrodes comprising a mass of crystals having a rectifying action.

7. In combination, an arrester having electrodes and an insulating medium between them, and a leakage path comprising material having a rectifying tendency.

8. In combination, a ring of insulating material, plates on opposite sides of the ring, a dielectric medium between the plates and inside of the ring comprising an outer annular layer of granular quartz, and an intermediate layer of granular quartz interspersed with granular carborundum.

9. In a device of the class described, a pair of plates, a medium between said plates comprising a mixture of sand in the proportion of three parts by weight and carborundum of approximately one part by weight, said sand being of the order of twenty mesh and said carborundum being of the order of twenty-four mesh.

10. In combination, a pair of metallic plates, an active mixture between said plates comprising sea sand and carborundum of substantially equal degrees of fineness, the proportions of carborundum to sand being one part of carborundum by weight to between two to four parts by weight of sand.

11. In combination, a pair of metallic plates, an active mixture between them comprising substantially five parts by weight of carborundum, twenty-four mesh, two parts by weight of boric acid in crystalline form, and fifteen parts by weight of sea sand, twenty mesh.

12. In combination, a pair of plates, and insulating medium between the plates comprising quartz, and an interspersed leakage medium comprising a granular conductive material, the proportion of quartz to conductive material being of the order of three to one.

13. In combination, a ring of insulating material, a pair of plates having their edges seated over the edge of the ring, an annular filling of quartz sand adjacent the ring of insulating material, and a central filling of sand and carborundum.

14. In combination, a ring of insulating material, a pair of plates having their edges seated over the edge of the ring, an annular filling of quartz sand adjacent the ring of insulating material, and a central filling of sand and carborundum, the plates at their central parts being parallel and closer to each other than at their rim portions.

15. In a device of the class described, a plurality of electrodes, insulating means for spacing said electrodes, a medium between said electrodes comprising a dielectric of high specific capacity and including a leakage path of relatively high resistance, and a mass of granular non-conducting material between the insulating means and said medium, said insulating means and said mass being inactive for direct electric conductivity and operating as parts of an electric condenser.

In witness whereof, I hereunto subscribe my name this 1st day of June, 1925.

GODFREY STEERUP.